United States Patent
Salas-de la Cruz et al.

(10) Patent No.: US 10,105,004 B2
(45) Date of Patent: Oct. 23, 2018

(54) WATER FILTER DEVICE

(71) Applicants: David Salas-de la Cruz, Philadelphia, PA (US); Randy Smith, Camden, NJ (US); Gloria Bonilla-Santiago, Camden, NJ (US)

(72) Inventors: David Salas-de la Cruz, Philadelphia, PA (US); Hideki Yamamoto, Maple Shade, NJ (US); Brianna Walker, Camden, NJ (US); Alex Nieves, Odenton, MD (US); Randy Smith, Camden, NJ (US); Gloria Bonilla-Santiago, Camden, NJ (US); Luis Davila, Camden, NJ (US)

(73) Assignee: Leap Academy University Charter School

( * ) Notice: Subject to any disclaimer, the term of this patent is extended or adjusted under 35 U.S.C. 154(b) by 309 days.

(21) Appl. No.: 14/706,208

(22) Filed: May 7, 2015

(65) Prior Publication Data
US 2015/0374169 A1 Dec. 31, 2015

Related U.S. Application Data

(63) Continuation of application No. 61/989,794, filed on May 7, 2014.

(51) Int. Cl.
| | |
|---|---|
| *A47J 31/60* | (2006.01) |
| *C02F 1/68* | (2006.01) |
| *C02F 1/28* | (2006.01) |
| *C02F 1/44* | (2006.01) |
| *A47J 31/44* | (2006.01) |
| *A47J 31/00* | (2006.01) |
| *C02F 1/00* | (2006.01) |

(52) U.S. Cl.
CPC ............ *A47J 31/605* (2013.01); *A47J 31/00* (2013.01); *C02F 1/002* (2013.01); *C02F 1/283* (2013.01); *C02F 1/444* (2013.01); *C02F 2307/02* (2013.01)

(58) Field of Classification Search
CPC ......... A47J 31/605; A47J 31/00; C02F 1/283; C02F 2307/02; C02F 1/002; C02F 1/444
USPC ............................ 99/290; 210/314, 266, 456
See application file for complete search history.

(56) References Cited

U.S. PATENT DOCUMENTS

| | | | | |
|---|---|---|---|---|
| 5,208,161 | A * | 5/1993 | Saunders | B01D 61/142 210/232 |
| 5,328,609 | A * | 7/1994 | Magnusson | C02F 1/003 210/266 |
| 6,395,170 | B1 * | 5/2002 | Hughes | B01D 35/02 210/232 |
| 6,569,329 | B1 * | 5/2003 | Nohren, Jr. | B01D 29/15 210/282 |
| 2004/0031821 | A1 * | 2/2004 | Lasry | B05B 11/0032 222/470 |

(Continued)

*Primary Examiner* — Dana Ross
*Assistant Examiner* — Kuangyue Chen
(74) *Attorney, Agent, or Firm* — Dilworth Paxson LLP; Edward F. Behm, Jr.

(57) ABSTRACT

A filter device is provided for use with bottles and comprises a multistage filter useful for removing from the water, chlorine and fluoride compounds, hormones, pesticides, prescription drugs and microorganisms. The filter device operates by placing a suction on a mouthpiece of said filter device to draw water through the multistage filter to clean it. An optional flavor cartridge may be provided with said multistage filter.

17 Claims, 6 Drawing Sheets

(56) References Cited

U.S. PATENT DOCUMENTS

| | | | | |
|---|---|---|---|---|
| 2008/0093374 A1* | 4/2008 | Martins | ............. | B65D 83/0805 |
| | | | | 221/63 |
| 2011/0278216 A1* | 11/2011 | Hull | .................. | A47G 19/2266 |
| | | | | 210/236 |
| 2011/0284479 A1* | 11/2011 | O'Brien | .................. | C02F 1/002 |
| | | | | 210/764 |
| 2014/0158539 A1* | 6/2014 | Lee | ........................ | B01D 61/48 |
| | | | | 204/519 |

* cited by examiner

WATER FILTER DEVICE

CROSS REFERENCE TO RELATED APPLICATION

This application claims the priority and benefit of U.S. Provisional Patent Application Ser. No. 61/989,794 entitled "Water Filter" filed on May 7, 2014, the entirety of which is incorporated herein by reference.

FIELD OF THE INVENTION

The present invention generally relates to water filters and more specifically a portable, replaceable and reusable water filter device.

BACKGROUND OF THE INVENTION

Water covers more than 70% of the Earth's surface. It is vital to all forms of life. Safe drinking water is essential to humans although water provides no calories or organic nutrients. Access to safe drinking water has improved over the last decades in almost every part of the world, but approximately one billion people still lack access to safe water and over 2.5 billion lack access to adequate sanitation.

Water fit for human consumption is called drinking water or potable water. Water that is not potable may be made potable by filtration or distillation, or by other methods. Water is not a finite resource, but rather it is re-circulated as potable water during precipitation in the water cycle in quantities that are many degrees of magnitude higher than human consumption. Therefore, it is the relatively small quantity of water in reserve in the earth (about 1% of our drinking water supply, which is replenished in aquifers around every 1 to 10 years), that is a non-renewable resource. The distribution of potable water can be scarce in remote parts of the world.

Humans require water with few impurities. Common impurities include metal salts and oxides, including copper, iron, calcium and lead, chemicals, sediment, particulate, and/or harmful microorganisms. Some solutes are acceptable and even desirable for taste enhancement and to provide needed electrolytes.

Water may require purification for human consumption. This may involve removal of undissolved substances, dissolved substances and harmful microorganisms. Popular methods include filtering, chlorination and boiling.

While water is an essential, life-sustaining fluid, drinking potable water, such as tap water and bottled water, and other emergency water sources, such as rivers, springs, streams and the like, can undermine your health. Potable water and emergency water sources can include chlorine, fluorine compounds, Trihalomethanes (THMs), hormones, pesticides, trace amounts of prescription drugs and even microorganisms which are more particular to emergency water sources. Accordingly, there is a need for a convenient, cost-effective, and easy to use a water filter device that can control water quality.

The invention provides a convenient and easy to use water filter that can control water quality and is cost-effective. The water filter includes numerous advantages over other technologies and products for several reasons. The water filter provides: (1) a robust and portable design; (2) a removable, reusable and replaceable filtering cartridge, (3) a multistage filtering capability provided by concentric tube column, porous inlet, micro polymeric reticular sponge, a powder activated carbon, flavoring pellets and porous outlet, (4) a replaceable mouthpiece, (5) a replaceable water tight lid, (6) compatible with any standard water bottle, 8 oz. to 1.5 L, (7) a suction functionality via contour lip-to-mouthpiece design, (8) a screw top connection to water bottle, (9) a water volume consumption up to 97% completion, and (10) a flavoring aftertaste made from natural ingredient.

The subject matter disclosed herein relates to a water filter device that improves upon or overcomes one or more of the shortcomings of existing water filters.

DESCRIPTION OF EMBODIMENTS OF THE INVENTION

Illustrative and alternative embodiments of the water filter 100, as well as methods of use thereof, will be described in connection with the figures hereto.

Figure 1:
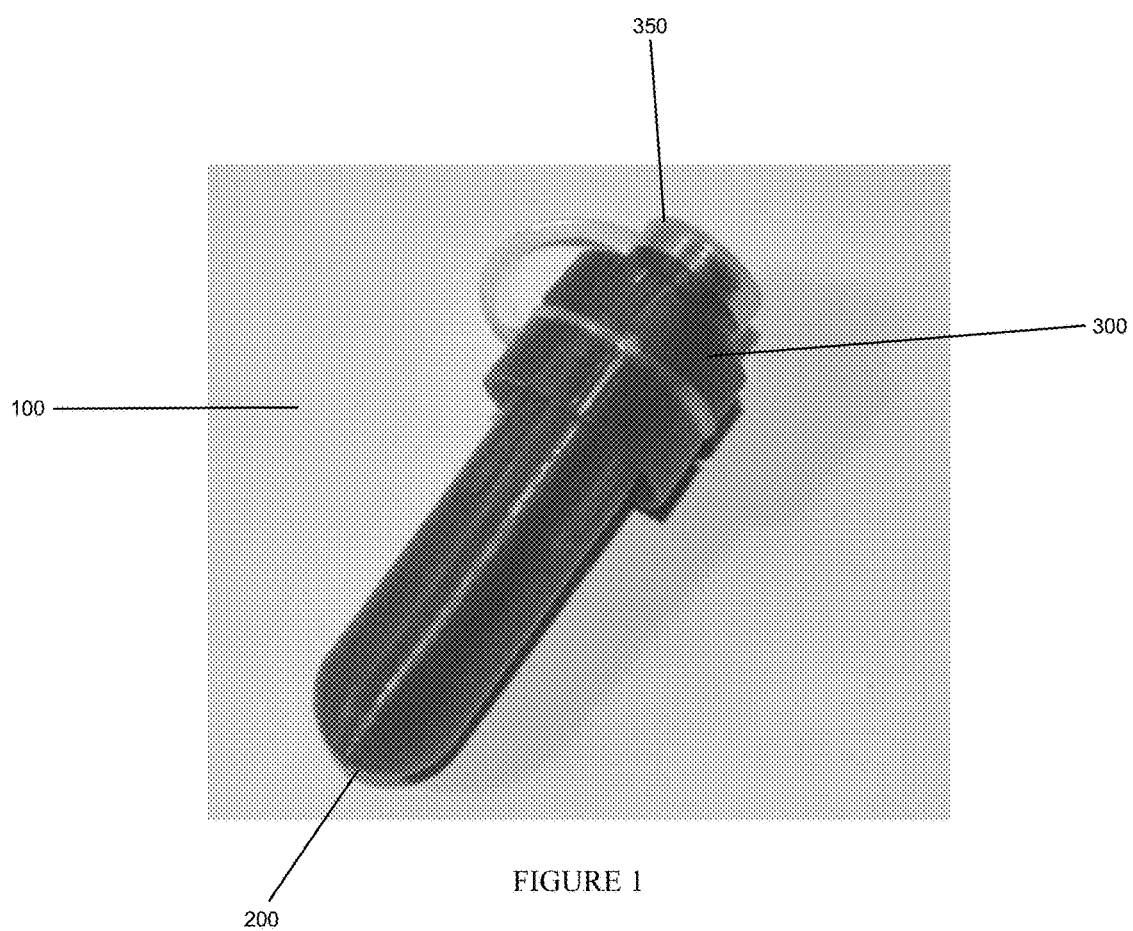
FIG. 1 shows a perspective view of an embodiment of the invention.
Figure 4:
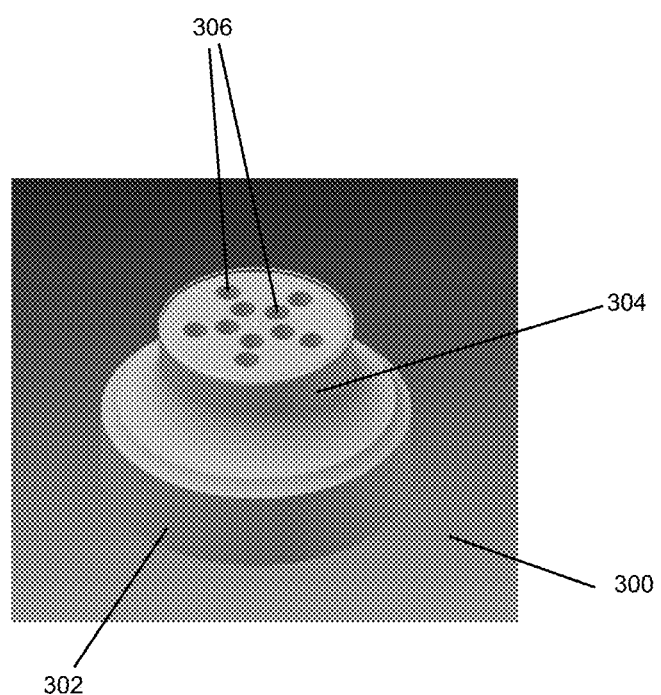
FIG. 4 shows a perspective view of a mouthpiece of the invention.
Figure 5:
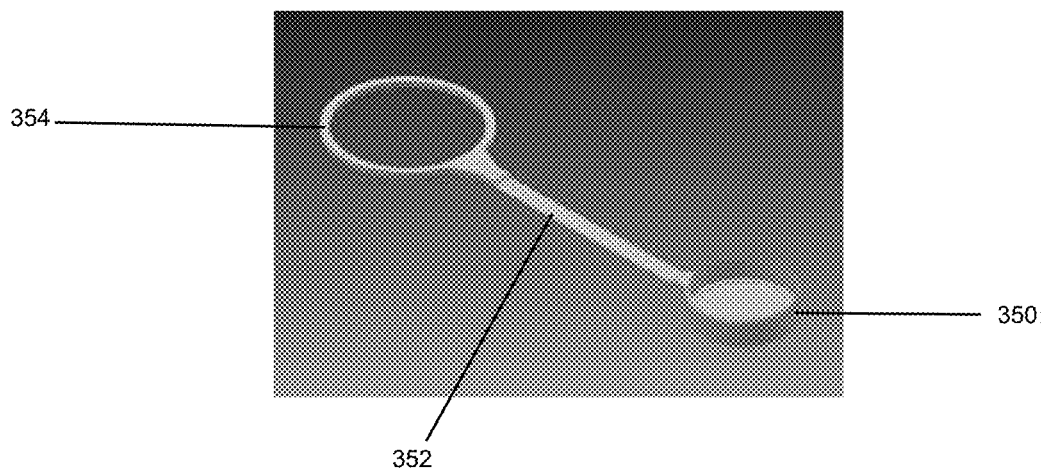
FIG. 5 shows a perspective view of a water tight lid of the invention.
Figure 6:
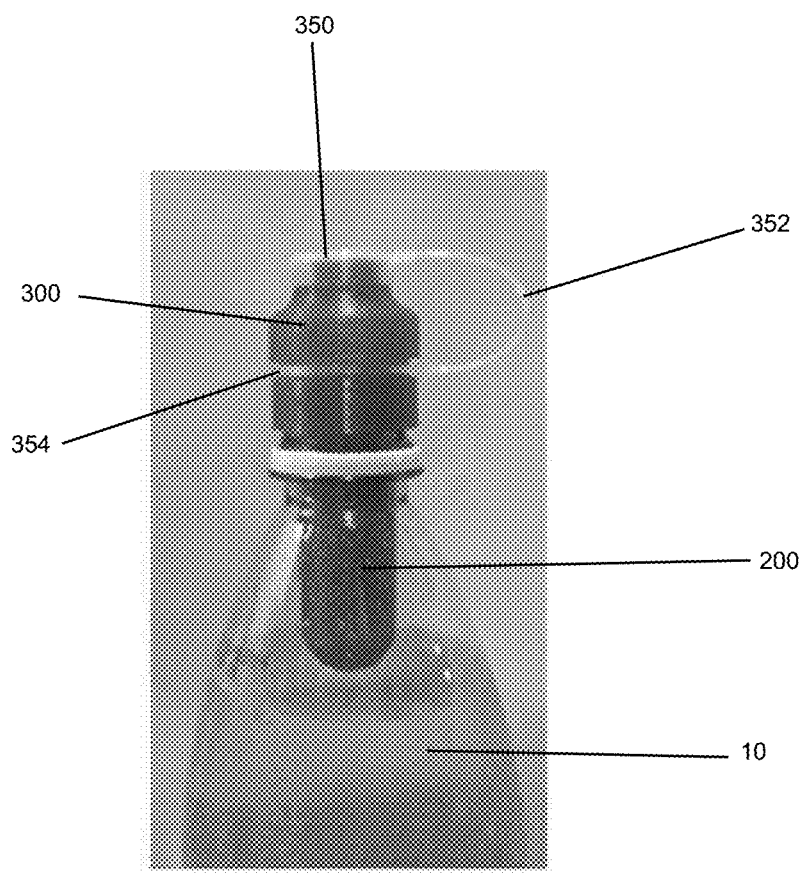
FIG. 6 shows the water filter device screwed onto a container.

Generally, the invention provides a portable, replaceable, and reusable water filter 100 as shown, for example, in FIGS. 1 and 6. The water filter 100 functions to remove sediment, particulate, chlorine, taste, odor, some organic constituents, and heavy metals from water passing through the filter. The filter 100 includes: (i) a portable water transport chamber 200 with filtration concentric tube column 212 as shown in FIG. 2, (ii) a reusable and replaceable polymeric and activated carbon filter cartridge 250 as shown in FIG. 3, (iii) a replaceable mouthpiece 300 as shown in FIG. 4, and (iv) a water tight lid 350 as shown in FIG. 5.

Referring to FIGS. 1 and 6, the water filter 100 is compact and portable. In non-limiting embodiments, the water filter 100 is designed to screw onto and fit partially within any standard-size water bottle 10 ranging from about 8 oz to 1.5 L as shown specifically in FIG. 6. Alternatively, the water filter 100 may be designed to fit on any other container with or without a screw top.

Figure 2:
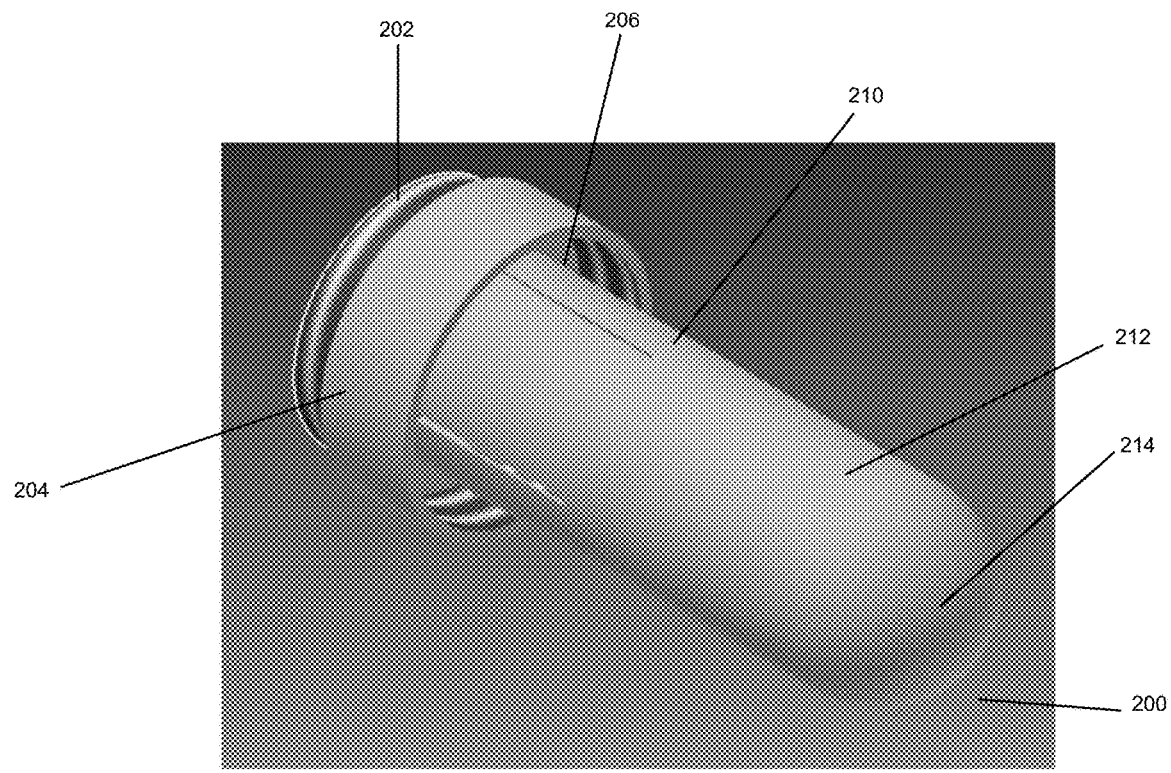
FIG. 2 shows a perspective view of a transport chamber of the invention.
Figures 3A, 3B:
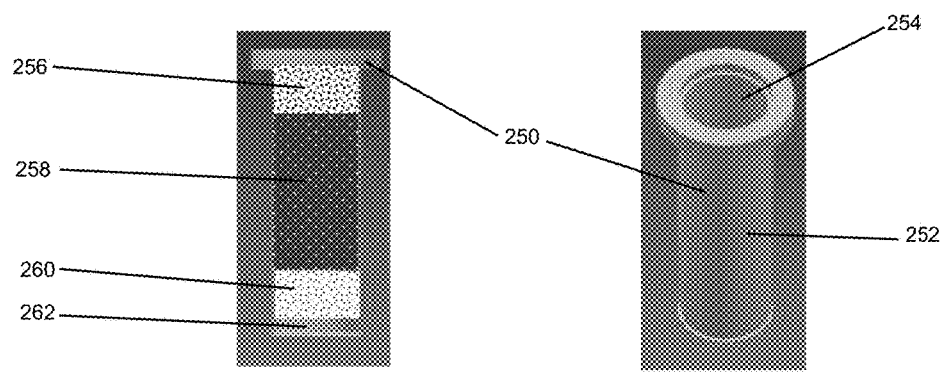
FIGS. 3a and 3b show cross sectional and perspective views of a two stage water filtration cartridge.
Figure 7A:
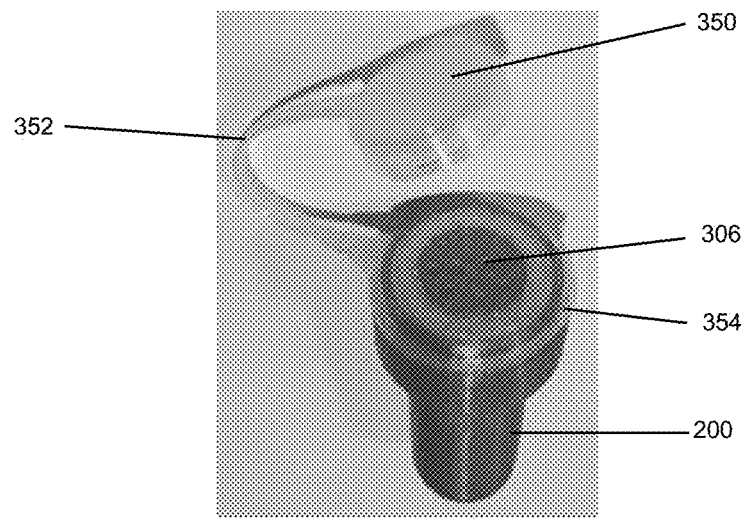
FIGS. 7a and 7b show perspective and exploded views of the water filter device.
Figure 7B:
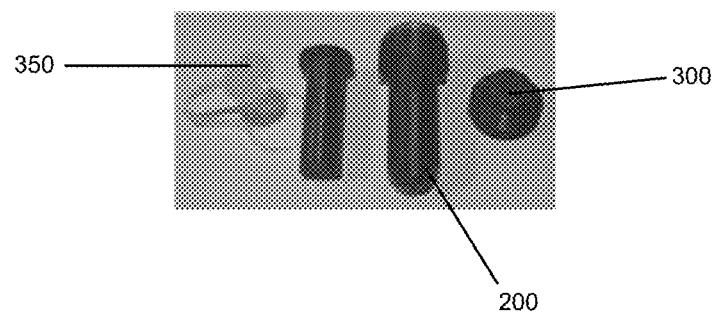

Referring now to FIG. 2, the transport chamber 200 comprises a mouth piece connection 202 for a snap fit with the mouthpiece 300 (shown in FIGS. 5, 6, and 7 a), an upper and lower diameter 204, a threaded connection 206 to engage corresponding threads on a bottle 10 or other container, and a housing 214 for the filter cartridge 250 (shown in FIGS. 3 a and 3 b).

Referring to FIGS. 3 a and 3 b, the filter cartridge 250 is shown comprising a porous inlet 262, a polymeric sponge 260, activated carbon 258, and optional flavored pellets 256. The filter cartridge 250 is held in place by a housing 252 for the two stage membrane, carbon filters and a porous outlet 254.

Referring to FIG. 4, a mouthpiece 300 is provided and may be replaceable. The interior of the mouthpiece comprises a threaded surface 302 that interfaces with corresponding threads on the mouthpiece connection 202 of the transport container 200. The mouthpiece 300 includes a porous outlet 306 comprising a plurality of communications.

Referring to FIG. 5, a snap fit lid 350 is provided and may provide a water tight seal when engaged with the top of the mouthpiece 300. The lid 350 may include a connection ring 354 that engages the transport chamber 200 and a inline connector 352.

In operation, polluted or potable water can be placed inside a standard water bottle 10 or other container, the water filter 100 is firmly screwed onto the water bottle 10 by engaging corresponding threads on the water bottle 10, the lid 350 is opened, then filtered water is drawn out of the bottle 10 through the mouthpiece 300 by creating suction on the exterior end of the filter cartridge 250. Upon suction, polluted drinking water flows into the concentric tube 210 via the portable water transport chamber 200. The water fills in the space between the chamber 200 and the external surface of the filter cartridge. Water then can only pass through the filter cartridge 250 into the porous outlet 254.

Water enters the replaceable filter cartridge 250 composed of a polymeric separation membrane 260 and a micro activated charcoal 258. The polymeric membrane 260 will remove particulates and sediment of a size of 50 micrometer or more from the water and the activated carbon 258 will remove from the water contaminants via an adsorption process. The replaceable cartridge 250 will function to remove chlorine, taste, odor, some organic constituent and heavy metals, for up to about 1-3 months depending upon the quality of the water passed through the filter 250. The portable water filter 100 is designed so that it can operation from 0 to 90 degree angle or more and along any axis. The flow rate capacity will depend on the quality of water and the suction applied via the mouthpiece 300.

The transport chamber 200 houses all the parts of the filter 100. In a non-limiting embodiment, transport chamber can have a length of about 2¾", an upper diameter of about 1¼", and a lower diameter of about ⅞". The chamber 200 incorporates the concentric tube column 210 and reusable and replaceable filter cartridge 250. The chamber 200 also interacts with the replaceable mouth piece 300 and tight lid 350.

Positioned within the transport chamber 200, the filter cartridge 250 is positioned in a manner to filter contaminated water through two filtration stages: membrane filtration and then activated carbon filtration.

The first filtration stage comprises a membrane filter 260 that can be a micropolymeric reticular sponge. The membrane filter 260 provides a fine and corrugated morphology to filter particulates and sediment of a size of about 50 micrometers with pore diameter from about 25 to 500 micrometers. A non-limiting example of a suitable reticular sponge is one manufactured and produced by Ceiba Technology.

The second filtration stage comprises a powder activated carbon 258. In an embodiment, the powder activated carbon 258 can have a particle size of about 50 to 150 micrometers. The powder activated carbon adsorption process filters chemicals and biomass matter. The carbon material pore structure size should be larger than the material it is trying to adsorb. A non-limiting example of a suitable activated carbon 258 is one manufactured and produced by Cabot Norit Activated Carbon Company.

The size and configuration of the filter cartridge 250 is not critical and can be configured to house the two stage filter. In an embodiment, the filter cartridge 250 has an outer dimension length of about 2", an outer diameter of about ⅞", and inner diameter of about ⅝". Water flows from within the bottle 10 into the water filter 100 through a porous inlet into the polymeric reticular sponge membrane 260 and activated carbon stages to a porous outlet 254.

A water flavoring aftertaste stage comprising added flavoring pellets 256 or the like may be included at the end of the filtration section to modify the water taste into lime, strawberry, cherry, mango, or other flavoring. Non-limiting examples of suitable flavoring pellets are manufactured by Prinova Company. The lifetime of the filter amounts to approximately 1-3 months depending on the quality of the water being filtered.

The water filter 100 also includes a replaceable mouth piece 300. The mouthpiece 300 can be installed in the upper part of the portable water transport chamber 200. The dimensional characteristics of the mouthpiece 300 are ideal for tight contact which enables ideal suction pressure to enable the filtration of contaminated water inside the bottle 10 through the filter device 100. The outlet section is composed of a porous exit 306 which enables a balanced suction across the surface. In a non-limiting embodiment, the replaceable mouth piece 300 has an outer lower diameter of about ¾" and an upper diameter of about 1⅛".

The water filter 100 also includes a water tight lid 350 that can be connected between the chamber 200 and the replaceable mouthpiece 300. Its inline connection 352 enables an easy connection and disconnection. The lid 350 can be replaceable with different colors. The lid 350 can be a top closure of the porous outlet 306 and lip to mouth contour 304 located in the replaceable mouthpiece 300.

The water filter 100 and its components can be composed of biodegradable PLA or ABS polymers. Other possible material includes stainless steel, duplexes, Inconel, polystyrene, polypropylene, cast aluminum, and glass-reinforced nylon base. The quality of the water produced using the filter 100 may ensure contaminant reduction as per Particulate class VI and NSF/ANSI Standard 42. The water filter 100 can be configured to be compatible with any standard water bottles 10, 8 oz to 1.5 L. Its screw lid design allows it to be used in variety of water bottle design.

Commercially, the water filtration device can be used in connection with: inner cities, communities, remote and impoverished regions, hiking and outdoor activities, recreational sports, and military personnel.

While the invention is described in conjunction with specific embodiments, many alternatives, modifications, permutations and variations will become apparent to those skilled in the art in light of the foregoing description. Accordingly, it is intended that the invention embraces all such alternatives, modifications, permutations and variations as falling within the scope of the claims below.

What is claimed is:

1. A water filter device comprising:
   a replaceable mouthpiece comprising a lip contour having suction functionality and a threaded surface on the interior of the mouthpiece to engage one or more threads of a chamber;
   a liquid tight lid removably connected to the mouthpiece;
   the chamber having one or more threads threadably engaged with one or more threads on a bottle, the chamber being removably sealed within the bottle and having one or more side wall openings to allow liquid flow passage from the bottle into the chamber;
   a filter cartridge sealed within the chamber, the filter cartridge having:
   a solid side wall cylindrical in shape composed of solid materials;

a permeable layer positioned at the distal end of the filter cartridge;
a porous outlet positioned at the proximal end of the filter cartridge; and
a macrofilter, a microfilter, and a flavoring filter positioned inline between the permeable layer and the porous outlet and within the solid side wall cylindrical in shape;
wherein liquid flows linearly from the chamber through the permeable layer and through the inline filters of the filter cartridge in response to suction received at the mouthpiece.

2. The water filter device of claim 1 wherein said chamber comprises a concentric tube.

3. The water filter device of claim 1 wherein said macrofilter comprises a polymeric membrane having a pore diameter of 25 to 500 micrometers that is capable of removing particulates and sediment of about 50 micrometers.

4. The water filter device of claim 1 wherein said microfilter comprises activated carbon material.

5. The water filter device of claim 1 wherein said filter cartridge includes flavor pellets to impart taste to said filtered water.

6. The water filter device of claim 1 further comprising a lid that snaps on to said mouthpiece.

7. The water filter device of claim 1 wherein said filter cartridge is operable at an angle of 0 to 90 degrees from a horizontal position.

8. A method for filtering water comprising:
providing a water filter device secured to a container with water including:
a chamber having a first communication configured to receive water into said chamber from a bottle through one or more side wall openings;
a filter cartridge sealed within said chamber, said filter cartridge having a solid side wall cylindrical in shape composed of solid materials and a permeable layer positioned at the distal end of the filter cartridge, the permeable layer configured to receive water from said chamber and let water pass through a macrofilter and a microfilter positioned inline between said permeable layer and a porous outlet of said filter cartridge; and
a mouthpiece having a lip contour threadably engaged with said chamber, wherein said mouthpiece comprises a second communication configured to permit passage of water out of said filter cartridge;
in response to suction placed externally on said water filter device through said second communication of said mouthpiece, passing said water through said first communication of said chamber, then through said filter cartridge to remove sediment, chemicals, and heavy metals that may be present in said water.

9. The method of claim 8 wherein said water filter device secured to said container is operable at an angle of 0 to 90 degrees from a horizontal position.

10. A portable water filter device comprising:
a chamber having a first thread configured to engage a bottle and a second thread configured to engage a replaceable mouthpiece having a lip contour, the chamber including an inlet communication on a side wall of the chamber configured to receive external water from the bottle;
a filter cartridge sealed within said chamber, said filter cartridge comprising a permeable layer positioned on a distal end of the filter cartridge, a macrofilter, a microfilter, and a porous outlet positioned on a proximal end of the filter cartridge, to filter water passing through said filter cartridge; and
said replaceable mouthpiece sealed to said chamber, said replaceable mouthpiece configured to, in response to receiving suction force, causing passage of water through said filter cartridge and out of said replaceable mouthpiece;
wherein the macrofilter and the microfilter are positioned in-line between the permeable layer and the porous outlet.

11. The water filter device of claim 10 wherein said chamber comprises a concentric tube.

12. The water filter device of claim 10 wherein said macrofilter comprises a polymeric membrane having a pore diameter of 25 to 500 micrometers that is capable of removing particulates and sediment of about 50 micrometers.

13. The water filter device of claim 10 wherein said microfilter comprises activated carbon material.

14. The water filter device of claim 10 wherein said filter cartridge includes flavor pellets to impart taste to said filtered water.

15. The water filter device of claim 10 further comprising a lid that snaps on to said mouthpiece.

16. The water filter device of claim 10 wherein said filter cartridge is operable at an angle of 0 to 90 degrees from a horizontal position.

17. The water filter device of claim 10 wherein said filter cartridge is capable of removing one or more of sediment, particulates, chemicals and microorganisms from said water.

* * * * *